(12) United States Patent
Swanson et al.

(10) Patent No.: US 7,613,137 B2
(45) Date of Patent: Nov. 3, 2009

(54) DATA STREAM COMMUNICATION

(75) Inventors: Jon Swanson, Queensbury, NY (US);
Robert B. McCown, Littleton, MA
(US); Jonathan D. Arnold, Medford,
MA (US)

(73) Assignee: Insors Integrated Communications,
Chicago, IL (US)

( * ) Notice: Subject to any disclaimer, the term of this patent is extended or adjusted under 35 U.S.C. 154(b) by 932 days.

(21) Appl. No.: 10/718,198

(22) Filed: Nov. 20, 2003

(65) Prior Publication Data

US 2004/0236593 A1    Nov. 25, 2004

Related U.S. Application Data

(60) Provisional application No. 60/472,648, filed on May 22, 2003.

(51) Int. Cl.
*H04L 12/16* (2006.01)
(52) U.S. Cl. .................. 370/260; 370/468; 370/395.4; 370/395.41
(58) Field of Classification Search .................. 370/389, 370/260, 270, 468, 395.4, 395.41, 395.42
See application file for complete search history.

(56) References Cited

U.S. PATENT DOCUMENTS

| | | | |
|---|---|---|---|
| 5,506,954 A | 4/1996 | Arshi et al. | |
| 5,758,079 A | 5/1998 | Ludwig et al. | |
| 5,838,914 A | 11/1998 | Carleton et al. | |
| 5,867,156 A | 2/1999 | Beard et al. | |
| 5,870,547 A | 2/1999 | Pommier et al. | |
| 5,872,923 A | 2/1999 | Schwartz et al. | |
| 5,874,960 A | 2/1999 | Mairs et al. | |
| 5,889,946 A | 3/1999 | FitzPatrick et al. | |
| 5,915,908 A | 6/1999 | Beutler | |
| 5,923,844 A | 7/1999 | Pommier et al. | |
| 5,938,724 A | 8/1999 | Pommier et al. | |
| 5,944,785 A | 8/1999 | Pommier et al. | |
| 5,948,022 A | 9/1999 | Carleton et al. | |
| 5,948,056 A | 9/1999 | Mizuno et al. | |
| 5,949,975 A | 9/1999 | Batty et al. | |
| 5,995,096 A | 11/1999 | Kitahara et al. | |
| 6,025,871 A | 2/2000 | Kantor et al. | |
| 6,047,314 A | 4/2000 | Pommier et al. | |
| 6,075,571 A * | 6/2000 | Kuthyar et al. ............... 348/584 |
| 6,078,948 A | 6/2000 | Podgorny et al. | |
| 6,115,027 A | 9/2000 | Hao et al. | |
| 6,151,020 A | 11/2000 | Palmer et al. | |

(Continued)

OTHER PUBLICATIONS

Polycom, "Guide to Conferencing and Collaboration", (2003), p. 2-9.

(Continued)

*Primary Examiner*—Ricky Ngo
*Assistant Examiner*—Chandrahas Patel
(74) *Attorney, Agent, or Firm*—Greer, Burns & Crain, Ltd.

(57) ABSTRACT

A method for communicating a subset of data streams includes steps of monitoring a plurality of data streams communicated between a plurality of standard users, recognizing at least one primary data stream, and communicating the at least one primary stream to a primary user. In an exemplary embodiment of the invention, the data streams include real-time audio and video data being communicated between attendees of a virtual meeting.

20 Claims, 3 Drawing Sheets

U.S. PATENT DOCUMENTS

| | | | |
|---|---|---|---|
| 6,201,859 B1 | 3/2001 | Memhard et al. | |
| 6,204,847 B1 | 3/2001 | Wright | |
| 6,216,177 B1 | 4/2001 | Mairs et al. | |
| 6,253,167 B1 | 6/2001 | Matsuda et al. | |
| 6,268,855 B1 | 7/2001 | Mairs et al. | |
| 6,271,839 B1 | 8/2001 | Mairs et al. | |
| 6,285,363 B1 | 9/2001 | Mairs et al. | |
| 6,292,166 B1 | 9/2001 | Palmer et al. | |
| 6,304,648 B1 | 10/2001 | Chang | |
| 6,329,984 B1 | 12/2001 | Boss et al. | |
| 6,421,047 B1 | 7/2002 | de Groot | |
| 6,442,758 B1 | 8/2002 | Jang et al. | |
| 6,584,493 B1 | 6/2003 | Butler | |
| 6,677,979 B1 | 1/2004 | Westfield | 348/14.12 |
| 6,760,749 B1 | 7/2004 | Dunlap et al. | |
| 6,775,247 B1 * | 8/2004 | Shaffer et al. | 370/260 |
| 6,894,715 B2 | 5/2005 | Henrickson | |
| 6,963,910 B1 * | 11/2005 | Belknap et al. | 709/223 |
| 7,002,973 B2 | 2/2006 | MeLampy et al. | |
| 7,009,971 B2 * | 3/2006 | Novaes | 370/390 |
| 7,054,820 B2 | 5/2006 | Potekhin et al. | |
| 7,133,923 B2 | 11/2006 | MeLampy et al. | |
| 7,151,762 B1 * | 12/2006 | Ho et al. | 370/338 |
| 7,193,996 B2 * | 3/2007 | Dobbins et al. | 370/392 |
| 7,224,382 B2 * | 5/2007 | Baker | 348/46 |
| 7,225,459 B2 * | 5/2007 | Magliaro | 725/98 |
| 7,263,063 B2 * | 8/2007 | Sastry et al. | 370/235 |
| 7,366,780 B2 * | 4/2008 | Keller et al. | 709/227 |
| 2001/0043571 A1 | 11/2001 | Jang et al. | |
| 2002/0133473 A1 | 9/2002 | Grande et al. | |
| 2004/0111472 A1 | 6/2004 | Swanson et al. | |
| 2004/0117446 A1 | 6/2004 | Swanson | |
| 2004/0249967 A1 | 12/2004 | Swanson | |
| 2005/0232151 A1 | 10/2005 | Chapweske et al. | |
| 2005/0237377 A1 | 10/2005 | Chapweske et al. | |

OTHER PUBLICATIONS

Intercall, "MeetingCenter", www.intercall.com (believed published circa 2003).
Tanberg, Tanberg Scheduler: Videoconference Scheduling and Room Reservation, www.tanberg.net (Jul. 2002).
Latitude Communications Inc., "Meeting Place Web 4.0", www.meetingplace.net (2002).
Jennifer Teig von Hoffman, "How to Start up an Access Grid Node Using Virtual Venues", (2001), p. 1-12.
Access Grid, "The Access Grid Project", www.accessgrid.org (believed published circa 2001).
Jennifer Teig von Hoffman, "Beginner's Guide to Facilitating Interactive Communications on the Access Grid," (2002), p. 1-18.
Jennifer Teig von Hoffman, "Guide to Distributed PowerPoint", (2001), p. 1-14.
RADVision, "IP Centric Conferencing", (2001) p. 1-14.
Wainhouse Research, "Will Your Next Video Bridge Be Software-Based?" Examining a Next-Generation Software-Based Video Conference Server, (2003) p. 1-10.
ClearOne, "A Guide to Multipoint Conferencing", (2002) p. 1-24.
Sonexis, "Evaluating Conferencing Solutions", A Buyer's Guide, p. 1-22.
Sprint, "How Businesses Can Get the Most Out of Conferencing and Collaboration Tools", (2002) p. 1-14.
Timothy M. O'Neil, Polycom, Inc., "Demystifying IP Migration for IT Professionals", (2003) p. 1-15.
Avaya, Inc. "Avaya Multipoint Conferencing Unit," Advanced Multipoint Conferencing for Collaborating in Powerful New Ways, Jan. 2002.

* cited by examiner

DATA STREAM COMMUNICATION

CROSS REFERENCE

The present application claims priority under 35 U.S.C. §119 on U.S. Provisional Application No. 60/472,648 filed on May 22, 2003.

FIELD OF THE INVENTION

The present invention is related to data communications, and to communication of a subset of data streams.

BACKGROUND OF THE INVENTION

Many data applications involve communications of a plurality of data streams. Audio and video conferencing, by way of example, may involve communication of audio data streams, video data streams, and other data streams. Within this exemplary application, some conferences simultaneously link many locations for communication of data such as video, audio, digital files, and the like. Each location may be communicating data streams from multiple cameras, microphones, and other sources. Under such circumstances, the bandwidth required for each individual location can be quite large. This large amount of required bandwidth can be costly, and may be unavailable for some conference attendees, thereby limiting their ability to participate.

One proposed solution is compression of signals. Even when using compressed signals, however, required bandwidth can be quite large. Also, compression may be accompanied by a loss of quality. Another proposed solution to this problem has been to send data streams from only one conference attendee to sites that are operating using limited bandwidth. By way of particular example, one proposed method in the case of video conferencing using Real-time Protocol (RTP) data streams is the use of source specific multicast (SSM). This proposed solution leaves many problems unresolved, however. For example, SSM only allows for selection of data streams based on IP address, and is therefore not effective in the case where a single IP address is generating multiple streams since all of the streams with that address will be sent. Also, SSM can be complicated and costly to implement, with the result that it is not widely supported.

Unresolved problems in the art therefore remain.

SUMMARY OF THE INVENTION

The present invention is directed to methods for communicating at least one primary data stream. An exemplary method of the invention includes steps of monitoring a plurality of data streams communicated between a plurality of standard users, the data streams including a plurality of continuous data streams communicated from each of the plurality of standard users to others of the standard users. The method further includes steps of recognizing at least one primary data stream from the plurality of streams and communicating it to a primary user. In an exemplary application, each of the standard users is a virtual meeting attendee and is generating multiple video and audio data streams and that have relatively high bandwidth resources for communications. In the exemplary application the primary user is a meeting attendee with more limited bandwidth resources.

An additional embodiment of the invention is directed to a computer program product for communicating one or more primary data streams in a virtual meeting environment. The program product causes one or more computers to: communicate a plurality of continuous real-time data streams that include discretely packetized video and audio data between a plurality of standard users, and to identify a primary subset of the plurality of continuous real-time data streams and communicate it to one or more primary users.

DETAILED DESCRIPTION

Before discussing exemplary embodiments of the present invention in detail, it will be appreciated that the invention may be embodied in a method, a system, and/or in a computer program product. For example, a method of the invention may be carried out by one or more users using computers, and a program product of the invention may include computer executable instructions that when executed by a computer cause that computer to carry out a method of the invention. Further, a computer that contains a program product of the invention may embody a system of the invention. It will accordingly be appreciated that in describing a particular embodiment of the present invention, description of other embodiments may also be made. For example, it will be understood that when describing a method of the invention, a system and/or a program product of the invention may likewise be described.

Figure 1:
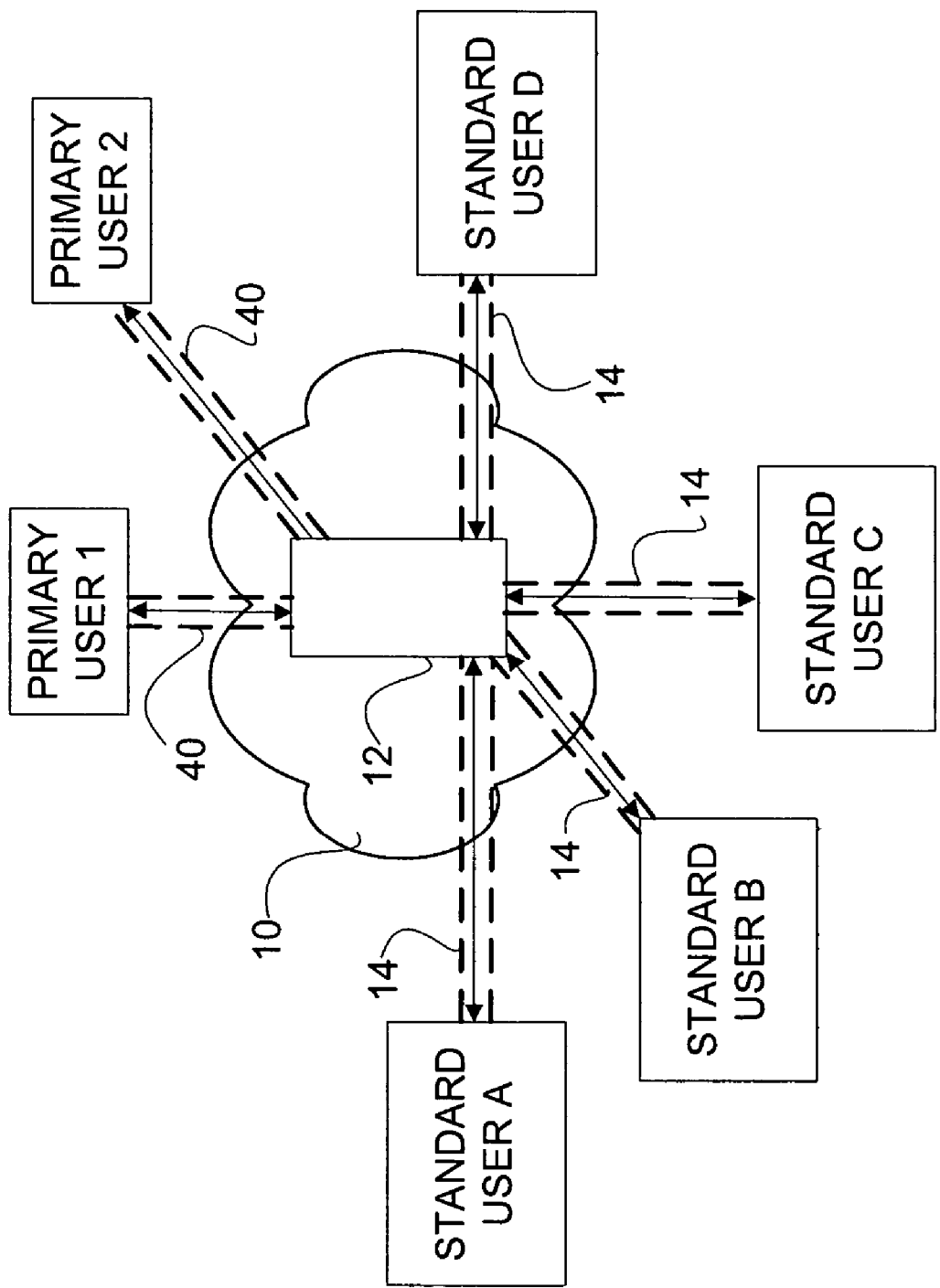
FIG. 1 is a schematic of a network.

Turning now to the drawings, FIG. 1 is a schematic of a network that is useful to describe an exemplary method of the invention. The network shown as a "cloud" 10 includes an interface 12 that links standard users A-D to one another. The term "interface" as used herein is intended to be broadly interpreted as comprising one or more components for linking communications between users. It may include, for example, a computer having a plurality of communication ports, a bridge, a software component running on a computer that facilitates communications, a networking card, a modem, and the like. An exemplary interface 12 is a bridge with a plurality of ports. Those skilled in the art will appreciate that as used herein the term port is intended to be broadly interpreted as a physical or logical destination and/or origination point for communications. Examples of ports include but are not limited to, network cards, an IP address, a TCP or UDP port number, and the like. The network 10 may be a digital or analog communications network, with a packet switched protocol network being one example. It may be a land-based, physically wired network, or may be a wireless network. Also, the protocol between bridge 12 and the standard users A-D may be that of a server and clients.

In an exemplary application, the network 10 is useful to facilitate a virtual meeting between attendees that are physically present at each of the standard users A-D. As used herein the term "virtual meeting" is intended to be broadly interpreted as a sharing of real-time communications between participants that are not physically present with one another. Communications with each of the standard users A-D is carried out on a 2-way basis from the network 10, with data sent to and received from each of the standard users A-D over the communications lines represented as dashed line "pipes" 14. These may comprise physically wired connections, or may be wireless connections. Real-time video, audio, and other data may be sent from each of the standard users A-D to all others of the standard users A-D through the bridge 12 and over the communications lines 14. As used herein the term "real-time" is intended to broadly refer to a condition of generally corresponding to actual time. For example, data is real-time if it takes one minute of data playback to describe an event that took one minute to occur. The real-time data may be recorded and still be real-time.

Those knowledgeable in the art will appreciate that these communications may be carried out in any of a number of generally known procedures. For example, known methods of one or more of uni-, multi-, or broad- cast may be used. Also, the data may be streaming. Each standard user site's cameras and microphones, by way of further example, may stream a continuous, real-time data stream on a particular multicast address and port number. As used herein the term continuous data stream is intended to broadly refer to a data stream sent in substantially continuous succession, although some degree of intermittency is contemplated. For example, a packetized data stream in internet protocol is "continuous."

One particular exemplary method for communicating and receiving the continuous data streams within the practice of the invention is according to the so-called "Real-time Transport Protocol" or "RTP." RTP is a widely supported Internet-standard protocol for the transport of real-time data, including audio and video. It can be used for media-on-demand as well as interactive services such as Internet telephony. RTP consists of a data and a control part. The latter is called RTCP. The data part of RTP is a thin protocol providing support for applications with real-time properties such as continuous media (e.g., audio and video), including timing reconstruction, loss detection, security and content identification.

Figure 2:
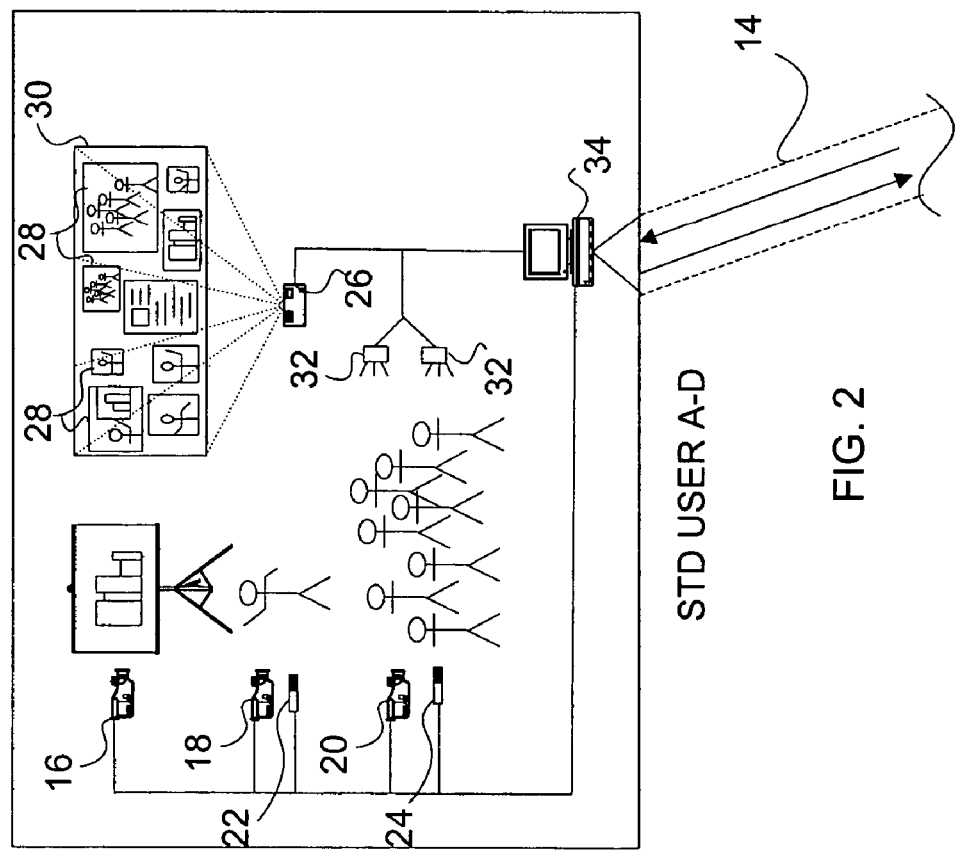
FIG. 2 is a detailed schematic of individual standard users A-D of the network of FIG. 1.

Communications of the streaming real-time data between standard users A-D may be further appreciated through consideration of the schematic of FIG. 2 that shows standard user A in detail. This schematic may be considered to be exemplary of each of the other standard users B-D. The standard user A includes cameras 1, 2 and 3 that have been shown as elements 16, 18 and 20 respectively. These cameras may be trained on different people or things at the standard user A, with an example being camera 1 at a blackboard, camera 2 at a speaker, and camera 3 at an audience. Standard user A may also include a first microphone 22 for the speaker and a second microphone 24 for the audience. Although not illustrated, other cameras, microphones, computers, gateways, firewalls, multi-plexers, co/decoders and like devices may also be present.

In addition to sending audio and video data across the communication line 16, each of the standard users A-D also receives video, audio, and other data communicated from each of the other standard users A-D. Referring once again to the schematic of FIG. 2 by way of example, one or more projectors 26 may be provided to project real-time video images 28 from one or more of the other standard users B-D on a screen 30. Any number of video images may be provided that show video data in real-time from any number of other cameras or other sources located at standard users B-D. Further, the video images displayed may include charts, graphs, documents, other digital files, replayed video files, and the like. One or more speakers 32 may also be provided to play real-time audio from the other standard users B-D or other sources.

A particular example of a data file in addition to audio and video data includes shared documents having text, images, numerical values, and the like. For example, within a virtual meeting different users at different locations may desire to all work on a single document. In such circumstances, continuous updates of the document should be communicated between users.

A computer 34 may be provided to receive and send all of the video, audio, documents, digital files and other data at the standard user A. An application program, such as an RTP application, may be running on the computer 34 that provides signal coding/decoding, signal compression/decompression, coordinates receiving and sending of the data streams, and controls some other aspects of sending and receiving of the data streams. For example, the computer 34 may be used to control which or how many video images 28 are displayed on the screen 30, to size the images 28, to set audio levels for the speakers 32, and the like.

Each discrete data stream that is communicated has a unique identifier associated with it. By way of example, methods, program products, and systems of the invention may be practiced across packet switched networks 10 that are configured for carrying discretely packetized data communications, with internet protocol ("IP") communications being one example, and RTP communications being a more specific example. In IP communications, continuous data is packed into discrete packets and provided with a destination address. The address may be a digital string, for instance, that identifies a port on the bridge 12. Each of the discrete packets of data may also include a unique identifier, such as a digital origination address.

The origination address may, for instance, be a digital string that identifies the computer 34 at standard user A. Within the RTP protocol, identifier information may be embedded into the header portion of individual packets by the RTP application programs running on the computers 34. For example, a particular data stream may have source identifying information such as an SSRC ("synchronization source" in RTP protocol) and/or another identifier that includes the user name, camera number, and IP address of the computer 34. The SSRC identifier carried in the RTP header and in various fields of RTCP packets is a random 32-bit number that is required to be globally unique within an RTP session.

According to the configurations of FIGS. 1-2, a real-time virtual meeting can occur between the standard users A-D. A rich, immersive, and extensive virtual meeting environment may be provided that includes video, audio, and other streaming data shared in real-time between multiple participants at multiple locations. For example, participants at each standard user A-D may simultaneously view and hear data from all others of the users A-D. Such meetings may be desirable for corporations, universities, government, and other organizations that have groups of people located remotely from one another that need to interact in a somewhat detailed manner.

It will be appreciated, however, that in conducting such virtual meetings, relatively large amounts of communication bandwidth may be required. Referring to the examples of FIGS. 1 and 2, each of the several cameras and microphones at each of the standard users A-D is sent as a streaming real-time data stream to each of the other standard users A-D. Table 1 summarizes the data communicated between the various primary users A-D:

|  | Outgoing Data Streams: | Incoming Data Streams: |
| --- | --- | --- |
| Standard User A | A1 (CAM 1) | From STD. CLNT. B: B1-B5 (5 Streams) |
|  | A2 (CAM 2) | From STD. CLNT. C: C1-C5 (5 Streams) |
|  | A3 (CAM 3) | From STD. CLNT. D: D1-D5 (5 Streams) |
|  | A4 (MIC 1) |  |
|  | A5 (MIC 2) |  |
| Standard User B | B1 (CAM 1) | From STD. CLNT. A: A1-A5 (5 Streams) |
|  | B2 (CAM 2) | From STD. CLNT. C: C1-C5 (5 Streams) |
|  | B3 (CAM 3) | From STD. CLNT. D: D1-D5 (5 Streams) |
|  | B4 (MIC 1) |  |
|  | B5 (MIC 2) |  |
| Standard User C | C1 (CAM 1) | From STD. CLNT. A: A1-A5 (5 Streams) |
|  | C2 (CAM 2) | From STD. CLNT. B: B1-B5 (5 Streams) |
|  | C3 (CAM 3) | From STD. CLNT. D: D1-D5 (5 Streams) |
|  | C4 (MIC 1) |  |
|  | C5 (MIC 2) |  |
| Standard User D | D1 (CAM 1) | From STD. CLNT. A: A1-A5 (5 Streams) |
|  | D2 (CAM 2) | From STD. CLNT. B: B1-B5 (5 Streams) |
|  | D3 (CAM 3) | From STD. CLNT. C: C1-C5 (5 Streams) |
|  | D4 (MIC 1) |  |
|  | D5 (MIC 2) |  |

As a result, in an exemplary meeting occurring according to the configuration of FIGS. 1-2 wherein each of the standard users A-D are meeting with one another, each standard user A-D is simultaneously streaming five discrete data streams (three cameras and two microphones) across the communication line 14 while also simultaneously receiving fifteen discrete data streams (five from each of the three other standard users) across the line 14. The bandwidth required for each of the communications lines 14 is therefore substantial. In alternate configurations, all of the audio streams from each site may be bundled together. For example, standard user A data streams A4 and A5 (MIC 1 and 2) may be bundled into a single stream.

Through methods, systems, and program products of the invention, it is possible for additional meeting attendees to participate in virtual meetings without having the bandwidth capacity to support the communications of standard users A-D. Referring to FIG. 1 by way of example, two additional meeting attendees are primary user 1 and primary user 2. Each of these attendees communicates with the network 10 via a communications line 40 that is lower in bandwidth than the lines 14. These attendees may include, for example, a home-worker or a traveling salesperson that wishes to participate in the virtual meeting. Through methods, systems, and program products of the invention, the primary users 1 and 2 are able to participate in the virtual meeting with the standard users A-D in a seamless and effective manner.

Figure 3:
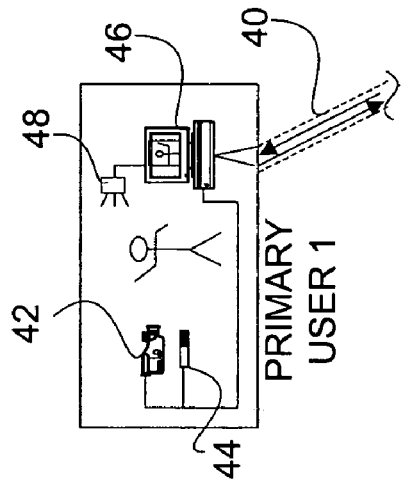
FIG. 3 is a detailed schematic of an individual primary user 1 of the network of FIG. 1.
Figure 4:
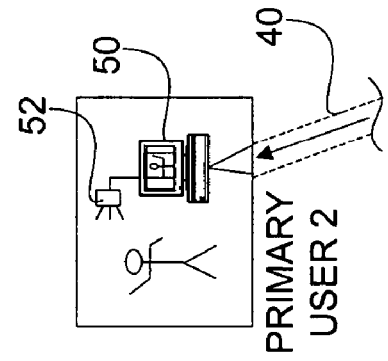
FIG. 4 is a detailed schematic of an individual primary user 2 of the network of FIG. 1; and, FIG. 5 is a flowchart illustrating steps of one exemplary method of the invention.

The schematic of FIG. 3 shows primary user 1 in detail. Primary user 1 has a single camera 42, a single microphone 44, a monitor 46, and a speaker 48. The camera 42 and microphone 44 are useful, for instance, to allow an individual at primary user 1 to send video and audio data to the network 10 over the communications line 40. Accordingly, primary user 1 is set up for two-way participation in the virtual meeting. Primary user 2, on the other hand, is configured only for one-way (receive data streams only, no sending). FIG. 4 illustrates the primary user 2 that includes only a monitor 50 and a speaker 52.

Figure 5:
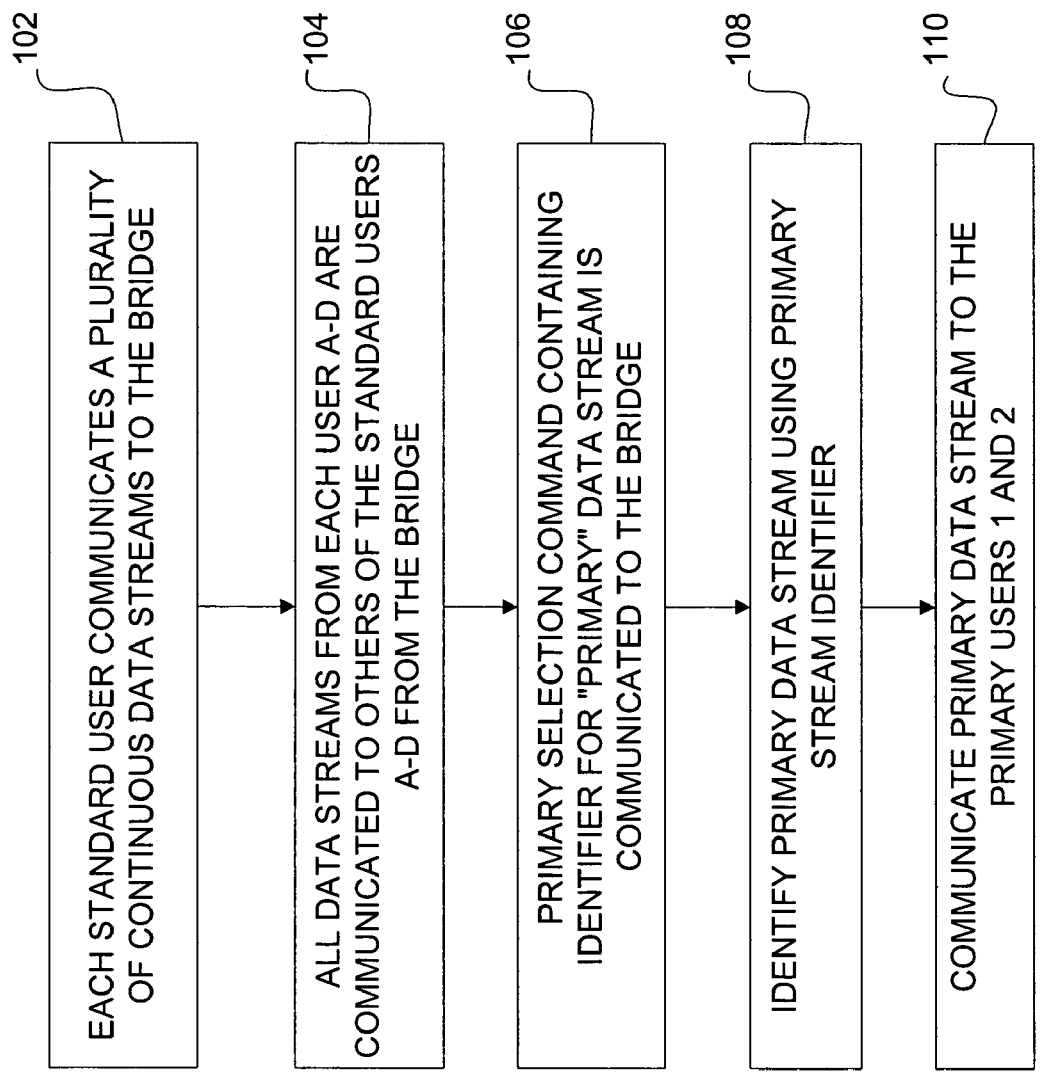

Having now described a network configuration useful for practice of an exemplary method, program product, and system of the invention, the flowchart of FIG. 5 may be considered. Referring now to that figure as well as FIGS. 1-4, a method, system, and program product that provides for substantially seamless participation of the primary users 1 and 2 with the higher bandwidth standard users A-D may be illustrated. Each of the standard users A-D communicates a plurality of continuous data streams including video, audio, and other data such as shared documents and the like to the bridge 12 (block 102). At the bridge 12, each of the continuous streams are communicated to all others of the standard users A-D (block 104). The continuous data streams communicated from the users A-D may include the various camera and microphone streams, and are preferably packetized. Additionally, each has a unique identifier that may include, for instance, data placed in the header portion of packets of the stream.

A primary selection command is also communicated from any of the standard users A-D to the bridge 12 (block 106). The primary selection command includes an identifier that identifies one or more of the plurality of data streams as a "primary" stream(s). The identifier may include information extracted from the header of the stream, such as an IP origination address, or a label such as "A1 (CAM 1)" for standard user A, camera 1. The primary selection command may include more than one identifier to identify more than one data stream. For example, one or both of standard user A camera 1 and microphone 1 might be identified as primary.

The primary selection command may originate from any of the standard users A-D, the primary users 1-2, or the bridge 12. A pre-determined selection may identify one or more primary streams. Additionally, a primary selection command may originate from any other location in communication with the network 10. For example, a meeting coordinator (not illustrated) may be monitoring or controlling the meeting, and may be located at some additional user (not illustrated) connected to the network 10. The command may be carried our, for example, by "highlighting" a particular data stream on one of the computers 34 using a mouse, a keyboard, or other selection tool. Pressing SHIFT-1, for example, may cause the identifier for a highlighted stream to be communicated in a primary selection command to a particular port at the bridge 12. Identifier information such as the SSRC ("synchronization source" in RTP protocol) header information with the standard user name and camera number will be included in the primary selection command.

Once the primary selection command is received at the bridge 12, it is used to identify the primary data stream from the plurality of streams being communicated between standard users A-D (block 108). This may be accomplished through any of several procedures, with an example including steps of storing the primary stream identifier in a memory and comparing the identifier for each of the plurality of data streams being communicated between the standard users A-D to the primary identifier to identify the primary stream. It will be understood that as used herein the terms "storing" and "memory" are intended to be broadly interpreted. A wide variety of memories will be useful for practice with the invention, with examples including, but not limited to, static and dynamic memories, RAM, ROM, cached storage, virtual memory, and the like.

Once the primary stream has been identified, it is communicated to the primary users 1 and 2 (block 110). By way of example, if the primary command identified camera 1 and microphone 1 from standard user A as "primary," these data streams would be communicated to the primary users 1 and 2 over the communications lines 40. The images from user A, camera 1 would then be played on the monitor 46 at primary user 1 and the audio from user A, microphone 1 to the speaker 48. Likewise, the speaker 52 and monitor 50 would play the audio and video, respectively, from standard user A, camera 1 and microphone 1.

In this manner, the primary users are able to receive a limited subset of the overall data streams being communicated between standard users A-D. By way of example, a single speaker may be seen and heard. Because of the limited data being communicated, substantially lower bandwidth is required.

Communication of the primary data streams to the primary users may be carried out in any number of particular manners. By way of example, the bridge 12 may monitor the traffic being communicated between the standard users A-D, may replicate the primary stream(s) after recognizing them, and communicate them to primary ports on the bridge 12 that are in communication with the primary users 1 and 2. In an additional invention embodiment, the bridge 12 may be replaced by first and second interfaces in communication with one another. A first or standard interface may link the standard users over one or more ports, and the second or primary interface may link the primary users over one or more ports for communication of the primary data stream(s).

By way of a particular example, an application program running on the bridge 12 may join a multi-cast address across which the traffic between the standard users A-D is occurring, and will begin monitoring that traffic. Incoming packets that include RTP header information matching the selected primary stream RTP header information may be sent to primary users "listening" to the bridge 12 at a selected port number.

Variations of selection and communication of primary data streams are contemplated within practice of different embodiments of the invention. Protocols may be enforced for limiting the primary command use. For example, only particular users may be allowed to generate the primary command, or only particular data streams may be allowed to be identified as primary. Also, selection of a primary stream may automatically replace a previously selected primary stream (so that only one stream may be primary at a time). For example, a second primary identification command may cause a primary data stream identified in a first command to be replaced with a newly identified primary data stream. Streams may also be selected according to a priority, so that one stream may be selected as a "first" primary, one as a "second" primary, and so on. Some or all of these streams may be delivered to primary users in a prioritized order depending on the capacity, viewing preferences, or like factors of that user (e.g., all streams received if required capacity is present, only "first" stream if capacity will only support one stream, etc.).

The present invention also contemplates receiving primary selection commands from the primary users. For example, primary user 1 may be able to select a primary stream from a text list that is communicated to him showing which streams are available. Also, the primary users may be able to send a primary selection command that changes the primary stream. For example, primary user 1 may send a primary selection command that changes the primary stream he is receiving to the next ranked stream on a prioritized list. In still another example embodiment, the bridge 12 may present a compressed or summarized list of all of the streams available to each of the primary users, who may then select from that list which stream(s) should be designated as primary. The compressed or summarized list may be in the form of a text list of stream origination or description (e.g., "Std. user A, Camera 1), thumbnail image(s) of the stream(s) (e.g., a worldwide webpage), a random sampling of the streams sent in succession one by one, a sampling of one or more of the streams sent out in a non-continuous manner (e.g., updated only once every 1 sec or other period).

Primary users may be identified through a dialogue or other steps. For example, when initially registering with the bridge 12, users may be queried to determine available bandwidth. If a user specifies a certain bandwidth that is known to be below that required to receive all of the expected communication traffic, that user may be classified as a primary user and linked to the port(s) serving the primary users A-B. Or, steps of an automated discovery may be carried out whereby the available bandwidth for each user will be automatically determined. Users having bandwidth insufficient to carry the full set of communications will be classified as primary users. Additionally, querying or discovery steps may be carried out to determine what level of communications each of the primary users can support. Referring to FIGS. 1, 3 and 4 by way of example, through querying and/or discovery steps, it may be determined that primary user 1 has bandwidth capacity to support receiving two primary data streams and sending two primary streams, while primary user 2 only has resources sufficient to receive two streams. The results of these discovery and querying steps may be used to establish rules for communication with the primary users (e.g., primary user 2 not allowed to send data streams, only to receive)

After making such a determination, primary users such as primary user 1 can provide streaming input data streams for bundling with the data streams being communicated between the standard users. Referring now to FIGS. 3 and 1, continuous data streams from the camera 42 and microphone 44 at primary user 1 may be communicated across the communications line 40 to the bridge 12. They may be received at the bridge 12 using one or more ports that are dedicated to primary user communications. These streams may then be bundled with all of the streams being communicated between the standard users A-D so that each of those standard users A-D will be able to see and hear an individual using the camera 42 and microphone 44.

In still an additional embodiment of the present invention, use of different primary streams is contemplated. For example, a different data stream could be selected as primary for each of primary users 1 and 2. Selection of primary streams may be used to determine which users get which primary streams. An additional aspect of primary stream selection may include a recipient identifier or other information that indicates which primary users will receive which primary streams. By way of particular example, a stream may be selected as primary for any users that log in to a meeting as a "salesman," while a second is primary for any who logs in as a "manager."

Embodiments of the present invention have been shown and described for illustration purposes in the environment of video/audio/data conferencing, and with particular examples of RTP format video and audio data. Those skilled in the art, however, will appreciate that the present invention will have benefits and value to many other applications. It is not limited to RTP, video, audio or any other particular data formats or types. It is believed, however, that the particular fields of video/audio/data conferencing and collaboration arts, and specifically those involving multiple participants with multiple data streams, will realize great benefits from embodiments of the present invention.

Also, it will be appreciated that the present invention may be practiced in the form of a method, a system, or a computer program product; or in combinations of one or more of these forms. For example, a computer program product embodiment of the invention may include program instructions stored in one or more computer readable memories that when executed cause one or more computers to carry out steps of a method of the invention. It will be further appreciated that a computer program embodiment may be executed by more than one single computer located at more than one location across one or more networks. Referring to FIGS. 1-4 by way of example, it will be understood that some steps of the invention may occur at the bridge 12, some at the computers 34, 46, and 50, and some at one or more other computers in communication with the network 10. An additional invention embodiment may include a system that includes the one or more computers on which the program instructions reside.

The invention claimed is:

1. A method for communicating at least one primary data stream to a virtual meeting attendee comprising the steps of:
monitoring at least one first video data stream being communicated from each of a plurality of virtual meeting standard users to all others of said standard users wherein each of said standard users receives a plurality of said first video data streams,
recognizing at least a first and a second primary video data stream from said at least one first video data stream being communicated from each of said plurality of standard users, said first and second primary video data streams are different from one another, and communicating said first primary data stream but not said second primary data stream and not said plurality of first video data streams to a first virtual meeting primary user while continuing to communicate each of said first video data streams from each of said standard users to all others of said standard users, and communicating said second primary data stream but not said first primary data stream and not said plurality of first video data streams to a second virtual meeting primary user while continuing to communicate each of said first video data streams from each of said standard users to all others of said standard users; and,
wherein communication of said first primary video stream to said first primary meeting attendee and communication of said second primary video stream to said second primary meeting attendee each requires less bandwidth than does communication of said plurality of first video streams to each of said standard users.

2. A method for communicating at least one primary data stream as defined by claim 1 and further including the step of receiving first primary selection command, and of using said first primary selection command to recognize said first primary data stream.

3. A method for communicating at least one primary data stream as defined by claim 1 wherein each of said plurality of first video data streams includes an identifier, and wherein the method further includes the step of comparing each of said identifiers to a stored primary data stream identifier to recognize said primary data stream.

4. A method for communicating at least one primary data stream as defined by claim 3 wherein said first video data streams comprise discretely packetized digital data in real-time, and wherein said identifiers comprise information from a stream header included with each discrete packet.

5. A method for communicating at least one primary data stream as defined by claim 1 wherein the step of monitoring a plurality of video data streams includes receiving said plurality of data streams over a first interface, and wherein the step of communicating said first and second primary video data streams to said first and second primary users is performed using at least a second interface while each of said at least one first video data streams from each of said plurality of standard users continue to be communicated to others of said standard users using said first interface.

6. A method for communicating at least one primary data stream as defined by claim 1 wherein each of said first video data streams comprises a continuous stream of real-time data contained in discrete packets communicated across a packet switched network.

7. A method for communicating at least one primary data stream as defined by claim 6 wherein each of said discrete packets has a header portion that includes an identifier that identifies the source of said data stream.

8. A method for communicating at least one primary data stream as defined by claim 1 wherein each of said plurality of standard users each comprises a virtual meeting attendee, and wherein the method further comprises the steps of:
communicating at least one first audio data stream from each of said standard users to all others of said standard users wherein each of said standard users receives a plurality of said first audio streams; and,
identifying one or more of said at least one first audio data streams as a primary audio data stream and communicating said primary audio data stream but not said plurality of first audio data streams to said primary user while continuing to communicate all of said first audio data streams from each of said standard users to all others of said standard users.

9. A method for communicating at least one primary data stream as defined by claim 1 wherein the step of monitoring said plurality of video data streams between said standard users is performed using one or more standard ports on a network interface, and wherein the step of communicating said first primary video data stream to a first virtual meeting primary user is performed using a first primary port that is different from said one or more standard ports, said first virtual meeting primary user in communication with said first primary port simultaneous with said standard users being in communication with said one or more standard ports.

10. A method for communicating one or more primary data streams over a network comprising the steps of:
receiving at least one first streaming real-time video data signal and at least one first streaming real-time audio data signal from each of a plurality of standard users connected by a network and communicating said at least one first streaming real-time video data signal and said at least one first streaming real-time audio data signal to all others of said plurality of standard users over said network, said first streaming real-time video and audio data signals each comprising discretely packetized data, each of said at least one first streaming real-time video data signals and said at least one first streaming real-time audio data signal having a unique identifier, each of said plurality of standard users connected to said network via a connection having at least a first bandwidth capacity;
receiving a primary selection command that identifies at least one of said first streaming real-time video data signal and said first streaming real-time audio signal originating from one of said standard users as primary video and audio data signals;

using said primary selection command to identify said at least one primary audio and at least one primary video data signal from said first streaming real-time video data signals and said first streaming real-time audio signal from said standard users; and, communicating said at least one primary video and said at least one primary audio but not said first streaming real-time video or audio data signals to at least one primary user over said network while each of said standard users continue to communicate said first real-time streaming video and audio data signals to all others of said standard users, said at least one primary user connected to said network with a connection having a bandwidth capacity of less than said first bandwidth capacity.

11. A method for communicating at least one primary data stream as defined by claim 10 wherein said at least one first video data signal communicated from each of said standard users comprises a plurality of video data signals.

12. A method for communicating one or more primary data streams over a network as defined by claim 10 and further including the steps of:

communicating a list to said at least one primary user containing video images of each of said first streaming video data signals from each of said standard users; and, wherein said primary selection command comprises a selection of at least one of said video images from said list by said at least one primary user.

13. A method for communicating one or more primary data streams as defined by claim 10 wherein the step of receiving said at least one primary selection command includes receiving said at least one primary selection command from one of said plurality of standard users or one of said at least one primary users.

14. A method for communicating one or more primary data streams over a network as defined by claim 10 wherein communication of said primary video and primary audio data signals to said at least one primary user requires less bandwidth than does communication of said first streaming video and audio data signals to each of said standard users.

15. A method for communicating one or more primary data streams as defined by claim 10 and further including the step of receiving at least one continuous video data signal from said at least one virtual meeting primary user and communicating said at least one continuous video data signal to each of said plurality of virtual meeting standard users whereby each of said standard users receive said first video data signals from all others of said standard users in addition to receiving a video data signal from said primary user.

16. A method for communicating one or more primary data streams as defined by claim 10 and further including the step of identifying said at least one primary user by determining that the bandwidth capacity of said at least one primary user is below that required to receive all of said plurality of first video streams being communicated between said standard users.

17. A method for communicating one or more primary data streams as defined by claim 10 wherein said at least one primary video data stream comprises a plurality of primary video data streams.

18. A method for communicating one or more primary data streams as defined by claim 10 and further including the step of providing a list to said at least one primary user, said list identifying each of said plurality of first video data signals being communicated between said standard users whereby said primary user may select one or more of said first plurality of signals from said list for viewing as said primary stream.

19. A method for communicating one or more primary data streams as defined by claim 18 wherein said list includes video images from each of said plurality of first video data streams.

20. A method for communicating one or more primary data streams as defined by claim 18 wherein said list includes thumbnail images from each of said plurality of first video data signals.

* * * * *